United States Patent [19]

Bezrukov et al.

[11] 3,771,633
[45] Nov. 13, 1973

[54] ROLLER CONVEYOR

[76] Inventors: Alexandr Fedorovich Bezrukov, ulitsa Klubnaya-8-A, kv. 75; Petr Semenovich Balykov, ulitsa Goncharova, 5, kv. 7; Arkady Vsevolodovich Mashkovsky, ulitsa Kuibysheva 5, kv. 15; Eduard Evgenievich Vasin, ulitsa Karla Libknekhta, 6, all of Ulyanovsk, U.S.S.R.

[22] Filed: June 5, 1972

[21] Appl. No.: 259,845

[52] U.S. Cl................................................ 193/35 A
[51] Int. Cl............................................. B65g 13/00
[58] Field of Search...................... 193/35 A, 35 R; 198/127 R

[56] References Cited
UNITED STATES PATENTS

| 2,738,103 | 3/1956 | Bisese | 193/35 A X |
| 2,146,893 | 2/1939 | Gotthardt | 193/35 A X |

*Primary Examiner*—Richard E. Aegerter
*Assistant Examiner*—H. S. Lane
*Attorney*—John C. Holman et al.

[57] ABSTRACT

A roller conveyor comprising groups of consecutively mounted carrying rollers over which a load moves under its own weight. Installed at the end of each group is a transfer roller with a spiral surface, transferring the load from the rollers of one group onto those of the following group. The axis of the first of the rollers is located above the plane of roller axes of the preceding group.

2 Claims, 4 Drawing Figures

ROLLER CONVEYOR

BACKGROUND OF THE INVENTION

The present invention relates to conveyors and more specifically it relates to gravity roller conveyors.

This invention can be used most successfully in production shops and storehouses as a conveying device, and as an assembly or a set-making conveyor.

Known in the art are gravity roller conveyors comprising groups of carrying rollers consecutively mounted on an inclined conveyor frame, and brake rollers installed between said carrying rollers. The brake rollers may be of a friction, hydraulic, pneumatic or some other type. Under the force of gravity the load moves over the carrying rollers of such conveyors with a certain acceleration. When the speed of the load rises to the maximum allowable limit the load runs over a brake roller, e.g. of a friction type, and makes it rotate. In view of the fact that the brake roller comprises a friction element between the rotating part of the roller and its fixed axle, rotation of such a roller involves consumption of energy for overcoming the forces of friction. As a result, part of the kinetic energy of the moving load is spent for heating the friction elements of the brake roller so that the speed of the load decreases after passing over the brake roller.

Thus, the movement of loads at a preset speed in the known gravity roller conveyors is accompained by an unproductive consumption of energy of the moving load spent for heating the friction elements of the brake rollers. And, as the only motive force of the gravity roller conveyor is constituted by the potential energy of the load whose value depends on the angle of conveyor inclination, or difference in the heights of its parts, the unproductive consumption of this energy in the braking devices cuts down the distance that can be covered by the conveyed load at a given inclination angle. That is why the working length of the known gravity roller conveyors is quite small which denies the possibility of using said conveyors in production shops in the capacity of the assembly conveyors and in storehouses as set-making conveyors.

As a rule, brake rollers become worn at a considerably faster rate than the carrying rollers which impairs the reliability of the known gravity roller conveyors.

Besides, the loads in the known gravity roller conveyors are transferred from the inclined section to the horizontal one by interconnecting said sections by a curved roller conveyor with a large radius of curvature or by a power-operated belt conveyor which calls for an additional source of energy. All these factors taken together complicate considerably the conveyor design and eventually raise the cost of load conveyance.

SUMMARY OF THE INVENTION

An object of the present invention is to provide a roller conveyor wherein the loads would be conveyed at a preset speed without the use of additional braking devices.

Another object of the invention is to provide a conveyor wherein the unproductive expenditures of potential energy of the moving load would be brought to a minimum.

The main object of the invention is to provide a conveyor which would allow the loads to be transferred from steep sections of the conveyor onto its shallow-sloping sections without the use of any additional devices.

These and other objects are accomplished by providing a roller conveyor comprising groups of carrying rollers consecutively arranged on an inclined frame wherein, according to the invention, installed at the end of each group of rollers is a transfer roller which transfers a load from the rollers of one group onto those of the other group, said transfer roller having a surface in the form of a spiral whose centre coincides with the axis of rotation of said roller while its section with a minimum radius faces the carrying rollers of the preceding group. The axis of rotation of the first carrying roller in each following group is located above the plane of the axes of rotation of the carrying rollers of the preceding group at a distance which is equal to the difference between the minumum and maximum radii of said spiral. Such a design reduces the speed of the load due to conversion of a part of its kinetic energy into potential energy when said load is carried by the transfer roller from the carrying rollers of one group over to those of the other group which allows the loads to be moved over the conveyor at a preset speed using no additional braking devices of the friction, hydraulic, pneumatic or another type. And, in view of the fact that the plane tangent to the carrying rollers of the following group can be inclined to the horizontal through a smaller angle than the plane tangent to the carrying rollers of the preceding group, the conveyor, according to the invention, allows the loads to be transferred from the steeper sections of the conveyor onto the shallow-sloping sections, including horizontal ones, without the use of any additional devices.

To ensure impact-free contact of the load with the transfer roller it is practicable that the latter should be installed in the initial position in such a manner that the point on the spiral located at a minimum distance from the centre of said spiral would lie in the plane tangent to the carrying rollers of the preceding group.

It is practicable that the transfer roller located at the end of the spiral should be provided with at least two additional carrying rollers arranged one after another, the surface of the first of these rollers matching with said spiral. At a constant size of the transfer roller this makes it possible to carry loads of various length, at the same time preventing the transfer roller against rotation due to inertia after the load has passed over it because the second additional roller bears against the bottom surface of the load and fixes the transfer roller in a position which is close to the initial one.

The invention will become more apparent from its description by way of example with reference to the accompanying drawings, wherein:

DETAILED DESCRIPTION OF A PREFERRED EMBODIMENT

Figure 1:
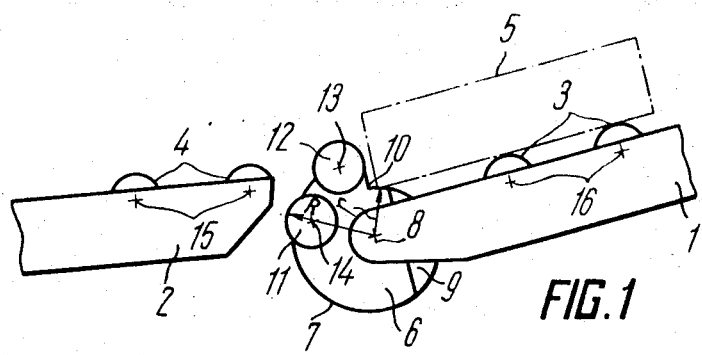
FIG. 1 is an elementary diagram of the conveyor according to the invention.

The conveyor, according to the invention, comprises groups 1 and 2 (FIG. 1) of carrying rollers 3 and 4 installed consecutively on an inclined frame and supporting a load which moves over said rollers under its own weight. At the end of each group 1 and 2 of the carrying rollers there is a transfer roller 6 whose surface 7 is of a spiral shape. The center of the spiral coincides with the axis 8 of rotation of this roller while its section with a minimum radius faces the preceding group of rollers, e.g. rollers 3 of group 1 as shown in FIG. 1. The transfer roller 6 with a spiral surface carries the load 5 from the rollers 3 of group 1 onto the rollers 4 of group 2.

The roller 6 is provided with a counterweight 9 which sets said roller in the initial position so that a point 10 on the spiral located at a minimum distance from the center of said spiral lies in a plane tangent to the carrying rollers 3 of group 1.

This ensures impact-free movement of the load over the transfer roller 6.

Arranged one after another at the end of the spiral of the roller 6 are additional carrying rollers 11 and 12, the surface of the first of them (11) matching with the spiral. The axis 13 of the roller 12 is located at a larger distance from the axis 8 of the roller 6 than the distance from the axis 14 of the roller 11 to the axis 8. At a constant size of the transfer roller 6 the provision of the additional rollers 11 and 12 ensures transporation by the conveyor of the loads of various length at the same time preventing the transfer roller 6 from rotating due to inertia after the load passes over it because the additional roller 12 bears against the bottom surface of the load and fixes the roller 6 in a position close to the initial one.

The group 2 of the rollers 4 is arranged so that the axis 15 of the first of these rollers is located at such a distance above the plane of the axes 16 of the rollers 3 which is equal to the difference between the minimum radius r and the maximum radius R of the spiral.

The conveyor operates as follows.

Figure 2:
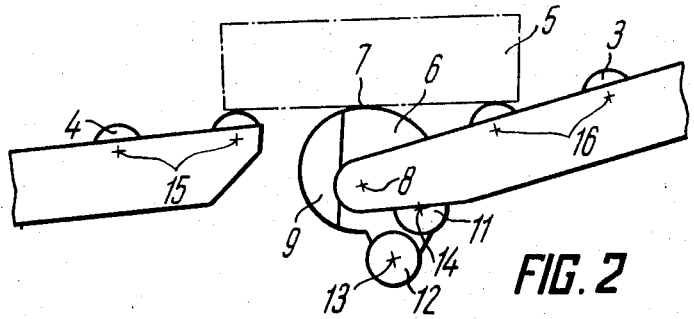
FIGS. 2 and 3 show the positions of the transfer roller of the conveyor, according to the invention, at the moment of load transfer from one group or rollers to another.

As the load 5 (FIG. 1) runs over the beginning of the spiral surface 7 of the transfer roller 6, this roller turns, lifts the load 5 by its spiral surface and transfers it onto the carrying rollers 4 of the group 2 (FIG. 2) which are located above the plane tangent to the carrying rollers 3. The speed of the lifted load decreases due to conversion of a part of the kinetic energy of the moving load into potential energy.

During further rotation of the transfer roller 6 (FIG. 3) the load 5 moving over the spiral surface of said roller comes over its additional carrying rollers 11 and 12. Contacting the bottom surface of the load 5, the roller 12 stops the roller 6 so that further movement of the load onto the carrying rollers 4 of the group 2 proceeds already over the additional carrying rollers 11 and 12.

Figure 3:
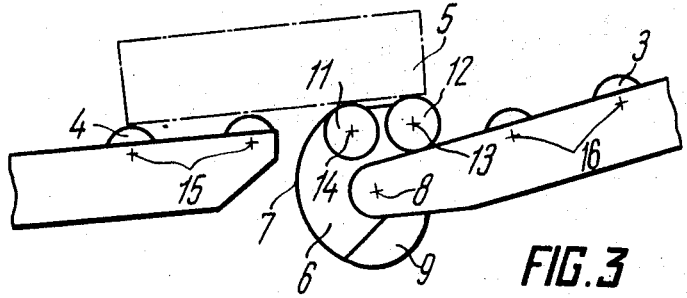

In the position shown in FIG. 3, when the load 5 moves at a minimum speed, the load can be stopped by an extensible detent (not shown in the drawings) for the performance of such operations as filling a box with parts, doing assembly work, etc. On completion of these operations the detent can be retracted, e.g. by a treadle, and the load resumes its movement to the next working post.

Figure 4:
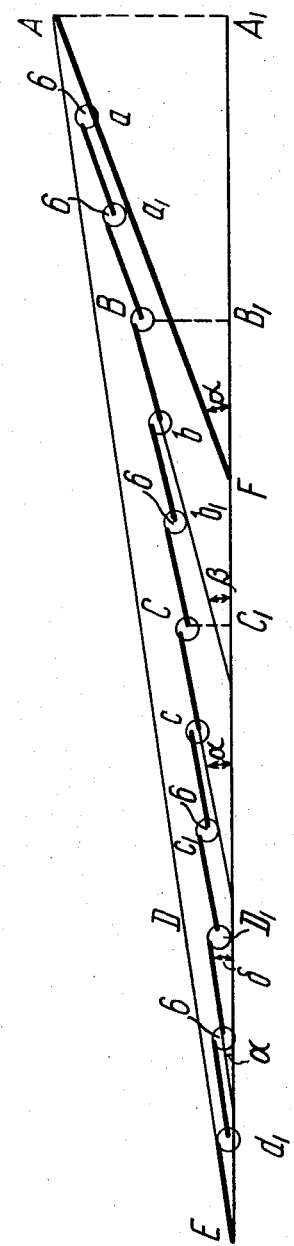
FIG. 4 illustrates the conveyor according to the invention functioning as a set-making conveyor.

Shown in FIG. 4 is a diagram of operation of the conveyor, according to the invention, in the capacity of a set-making conveyor at a finished products storehouse, gathering sets of products in containers or on pallets.

Shown between positions A and B is a section of the conveyor which represents the conveyor, according to the invention, comprising three groups of carrying rollers A, $a$ $aa_1$ and $a_1$B with transfer rollers 6 installed between them. The roller groups A$a$, $aa_1$ and $a_1$B are installed at one and the same angle $\alpha$ to the horizontal. The AB section of the conveyor is meant for the preliminary filling of the containers so that the angle $\alpha$ is intended to ensure the movement of the empty containers under their own weight.

Illustrated between positions B and C is a similar conveyor comprising the groups of carrying rollers B$b$, $bb_1$ and $b_1$C with transfer rollers 6 arranged between them. In view of the fact that the section BC is intended for carrying heavier loads than the section AB, the groups of carrying rollers B$b$, $bb_1$ and $b_1c$ are inclined to the horizontal at an angle $\beta$ which is smaller than the angle $\alpha$ but sufficient for ensuring the movement of the above-mentioned loads.

The next section of the conveyor located between positions C and D represents the conveyor, according to the invention, with the groups of carrying rollers C$c$, $cc_1$ and $c_1$D with transfer rollers 6 set between them. This section is intended for carrying heavier loads than section BC, therefore the groups of carrying rollers C$c$, $cc_1$ and $c_1$D are inclined to the horizontal at an angle $\gamma$ which is smaller than the angle $\beta$ but sufficient for the movement of heavier loads under their own weight.

The last section of the set-making conveyor illustrated between positions D and E represents the conveyor according to the invention with the groups of carrying rollers D$d$, $dd_1$ and $d_1$E. This section is intended for carrying still heavier loads so that the groups of carrying rollers D$d$, $dd_1$ and $d_1$E are inclined to the horizontal at an angle $\delta$ which is smaller than the angle $\gamma$ at which the corresponding rollers of the section CD are arranged.

Illustrated between positions A and F is the known gravity roller conveyor which is inclined to the horizontal at the same angle $\alpha$ as the first section AB of the conveyor, according to the invention. The empty containers enter the set-making conveyor at point A with a certain reserve of potential energy created by the difference in the height between points A and $A_1$ of the conveyor and by the weight of the containers.

At the conveyor section AB with an inclination angle of $\alpha$ the containers are filled with loads to a value of $P_1$. As the containers are gradually loaded, their speed is periodically reduced by the transfer rollers 6 at points $a$ and $a_1$. The partly loaded containers arrive at the point B at a certain speed V.

On the conveyor section BC the containers are filled with loads to a value of $P_1+P_2$ so that the motive force acting on the containers increases. But, in view of the fact that the conveyor inclination angle at point B has decreased to $\beta$ and the speed of the load at points $b$ and $b_1$ decreases when said load moves over the transfer rollers 6, the containers arrive at point C at the same speed V.

On the conveyor section CD the containers are loaded to a value of $P_1+P_2+P_3$ and the motive force applied to the containers grows again. However, since the conveyor inclination angle on section CD has decreased to $\gamma$ and the speed of the containers at points $c$ and $c_1$ is consecutively reduced while they move from one group of carrying rollers to another, the load arrives at point D again at the same speed V.

On the conveyor section DE the weight of the load increases to $P_1 + P_2 + P_3 + P_4$. But, inasmuch as the conveyor inclination angle at the point D has decreased to $\delta$ and the speed of the containers also decreases at points $d$ and $d_1$, when the loaded containers move from one group of carrying rollers to another, the load arrives at point E at the same speed V.

Thus, at a height differential $AA_1$ of the conveyor the containers with loads $P_1 + P_2 + P_3 + P_4$ cover a distance $A_1E$ in the course of making a set and this distance constitutes the working length of the set-making conveyor realized according to the invention.

In order to ensure the movement of empty containers under the same conditions over the known conveyor shown by a straight line AF in the drawing, said conveyor must also be inclined at an angle $\alpha$.

Then, irrespective of the number and weight of the subsequent loads, the loaded containers will arrive at the level $A_1E$ at the point F.

In this case the length $A_1F$ represents the working length of the known conveyor AF with the same height difference $AA_1$ as that of the conveyor AE realized according to the invention.

If we compare the values $A_1F$ and $A_1E$ it will become obvious that the working length AE of the set-making conveyor is considerably larger, the height differential being the same, than the working length AF of the known conveyor. This makes the conveyor according to the invention suitable for a considerably larger number of operations than it is possible with the known gravity roller conveyors. If the known roller conveyor were inclined to the horizontal at an angle $AEA_1$, then the loads weighing less than $P_1 + P_2 + P_3 + P_4$, to say nothing of empty containers, would not be able to move over such a conveyor under their own weight.

What we claim is:

1. A roller conveyor comprising: an inclined frame means; groups of carrying rollers having similar diameters and mounted consecutively on said frame means for conveying loads under their own weight; a transfer roller means rotationally installed on said frame means at the end of each of said groups, for transferring the loads from the carrying rollers of one group onto the carrying rollers of another group and provided with a spiral surface having a beginning point which defines a minimum radii of said spiral and an ending point which defines a maximum radii of said spiral and the centre of which coincides with the axis of rotation of said transfer roller means while its section of minumum radius faces the carrying rollers of a preceding group; the axis of rotation of the first of said carrying rollers in each successive group being located above the plane of the axes of rotation of said carrying rollers of the preceding group at a distance equal to the difference between the minimum and maximum radii of said spiral.

2. A conveyor according to claim 1 wherein said transfer roller means has at least two additional carrying rollers disposed one after another from the ending point of said spiral, the surface of said roller farthest away from said ending point conjugating with said spiral.

* * * * *